(12) United States Patent
Maduro et al.

(10) Patent No.: US 11,250,496 B2
(45) Date of Patent: Feb. 15, 2022

(54) MOBILE DEVICE KEYBOARD INTEGRATED SALES PLATFORM

(71) Applicant: Peiky SAS, Bogota (CO)

(72) Inventors: Hernando Alfonso Varón Maduro, Santa Marta (CO); Ricardo Mendoza Tenorio, Bogota (CO); Andres Felipe Espinosa Vela, Bogota (CO); Juan David Espinosa Vela, Bogota (CO)

(73) Assignee: Peiky SAS, Bogota (CO)

( * ) Notice: Subject to any disclaimer, the term of this patent is extended or adjusted under 35 U.S.C. 154(b) by 0 days.

(21) Appl. No.: 16/678,779

(22) Filed: Nov. 8, 2019

(65) Prior Publication Data

US 2020/0226670 A1 Jul. 16, 2020

Related U.S. Application Data

(60) Provisional application No. 62/791,157, filed on Jan. 11, 2019.

(51) Int. Cl.
| | | |
|---|---|---|
| *G06Q 30/00* | (2012.01) | |
| *G06Q 30/06* | (2012.01) | |
| *G06F 3/0488* | (2013.01) | |
| *G06Q 20/32* | (2012.01) | |
| *H04L 12/58* | (2006.01) | |

(52) U.S. Cl.
CPC ..... *G06Q 30/0643* (2013.01); *G06F 3/04886* (2013.01); *G06Q 20/3223* (2013.01); *G06Q 20/3255* (2013.01); *H04L 51/046* (2013.01); *H04L 51/16* (2013.01)

(58) Field of Classification Search
CPC ..................................................... G06Q 30/00
See application file for complete search history.

(56) References Cited

U.S. PATENT DOCUMENTS 9,767,458 B2 * 9/2017 Dorsey .................. G06Q 20/10
10,467,602 B2 * 11/2019 Davis ..................... G06Q 20/10
10,489,768 B2 * 11/2019 Szeto ................. H04M 1/72552

(Continued)

FOREIGN PATENT DOCUMENTS

| KR | 1020160127915 | 11/2016 |
| WO | 2017172973 | 10/2017 |

OTHER PUBLICATIONS

Peiky, "Peiky Keyboard helps you with everything . . . ", webpage retrieved on Google, dated Oct. 12, 2018. (Year: 2018).*

(Continued)

*Primary Examiner* — Mark A Fadok
(74) *Attorney, Agent, or Firm* — Socal IP Law Group LLP; Jonathan Pearce

(57) ABSTRACT

There is disclosed a mobile device integrated keyboard sales platform that enables a potential seller or shopkeeper to complete a sale, including transmission of product information, generation of a purchase order form, generation of a delivery information form, and receipt of payment all using an alternative keyboard installed on a mobile device. Every aspect of the process may be completed reliant upon the alternative keyboard, rather than a stand-alone application or multiple stand-alone applications, and may take place in any chat application or multiple chat applications or in a special purpose sales chat application.

19 Claims, 13 Drawing Sheets

(56) References Cited

U.S. PATENT DOCUMENTS

| | | | |
|---|---|---|---|
| 2014/0052633 A1* | 2/2014 | Gandhi | H04L 51/046 705/44 |
| 2014/0058939 A1* | 2/2014 | Savla | G06Q 20/00 705/42 |
| 2014/0279198 A1* | 9/2014 | Berk | G06Q 50/01 705/26.7 |
| 2014/0316937 A1* | 10/2014 | Jiao | G06Q 30/0643 705/26.8 |
| 2016/0171478 A1* | 6/2016 | Kwon | G06Q 20/3226 705/44 |
| 2016/0267447 A1* | 9/2016 | Davis | G06Q 20/4016 |
| 2017/0011383 A1* | 1/2017 | Melzer | G06Q 20/223 |
| 2017/0017939 A1* | 1/2017 | Killoran, Jr. | H04W 4/14 |
| 2017/0118154 A1* | 4/2017 | Venkatakrishnan | H04L 51/18 |
| 2017/0193481 A1* | 7/2017 | Szeto | G07F 9/023 |
| 2018/0113609 A1 | 4/2018 | Gnedin et al. | |
| 2018/0137550 A1 | 5/2018 | Choi et al. | |
| 2018/0293601 A1* | 10/2018 | Glazier | G06Q 30/0214 |
| 2018/0373683 A1* | 12/2018 | Hullette | G06F 40/134 |
| 2019/0020615 A1* | 1/2019 | Golden | H04L 51/10 |
| 2019/0114697 A1* | 4/2019 | Lasker | G06Q 20/322 |

OTHER PUBLICATIONS

Peiky2, http://web.archive.org/web/20171231035948/http://peiky.com:80/, dated Dec. 31, 2017. (Year: 2017).*

Patel, Neil, "How to use Facebook Messenger to sell more E-commerce products", nielpatel.com, dated Apr. 10, 2018 (Year: 2018).*

Fingas, J., "Chat Viber hopes you'll shop from its keyboard", androidcommunity.com, dated Jul. 20, 2017. (Year: 2017).*

World Intellectual Property Organization, International Search Report and Written Opinion for International Application No. PCT/US2020/050241, dated Jun. 10, 2020, pp. 1-10.

* cited by examiner

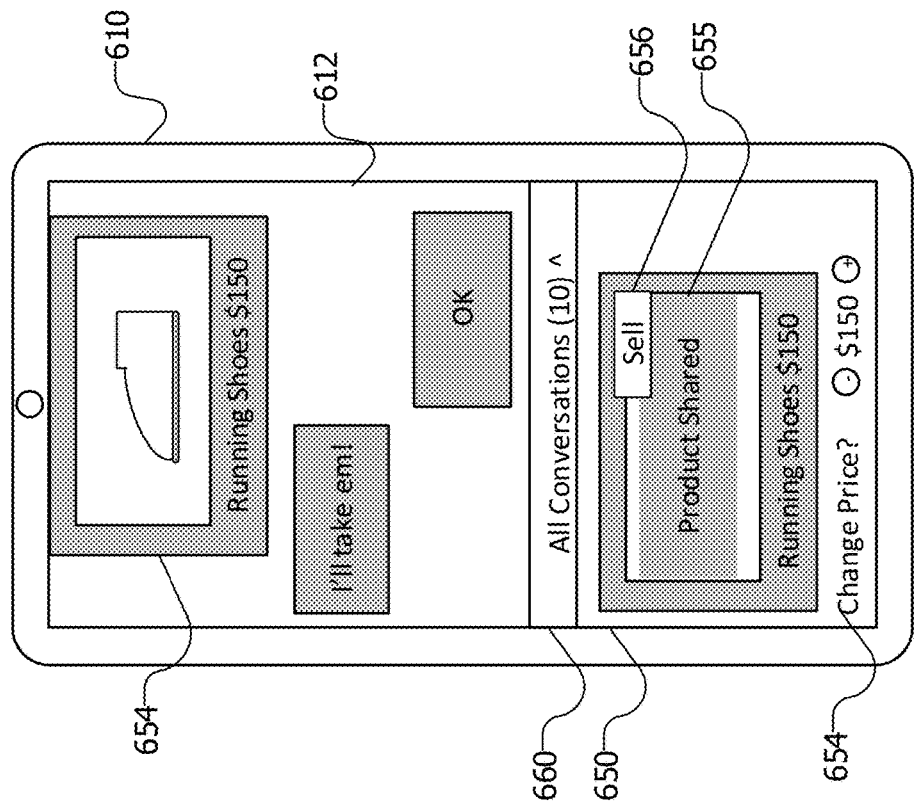
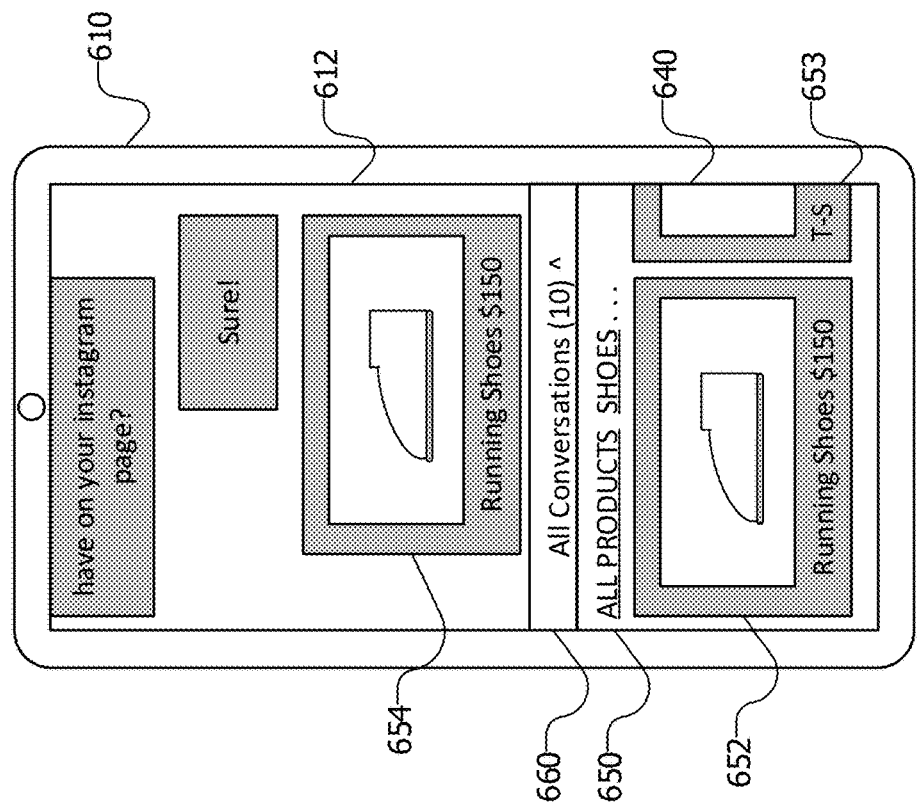
FIG. 7B
FIG. 7A
FIG. 7

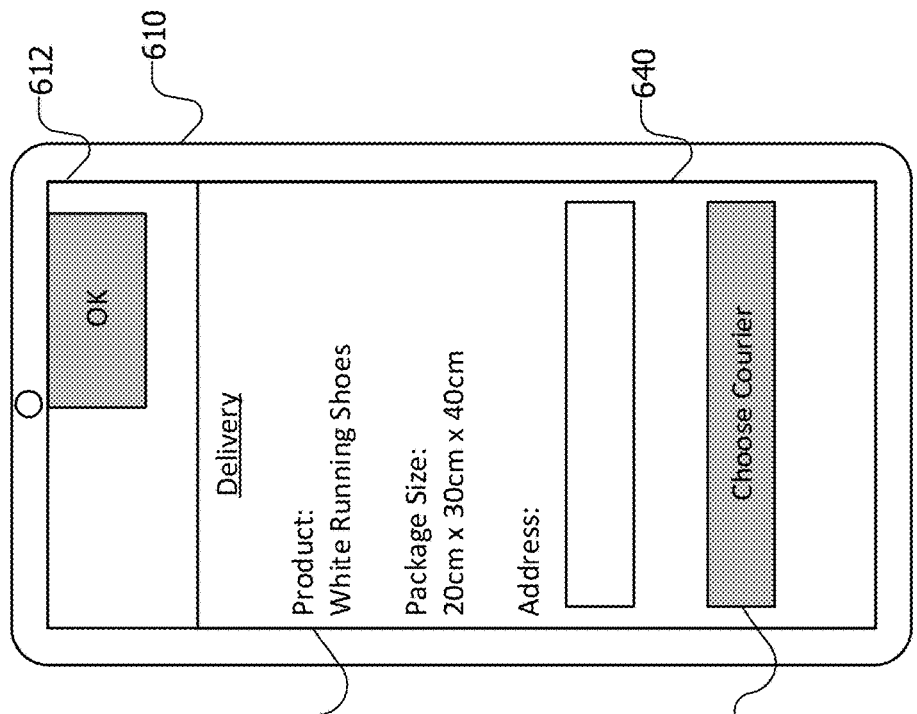
FIG. 8B
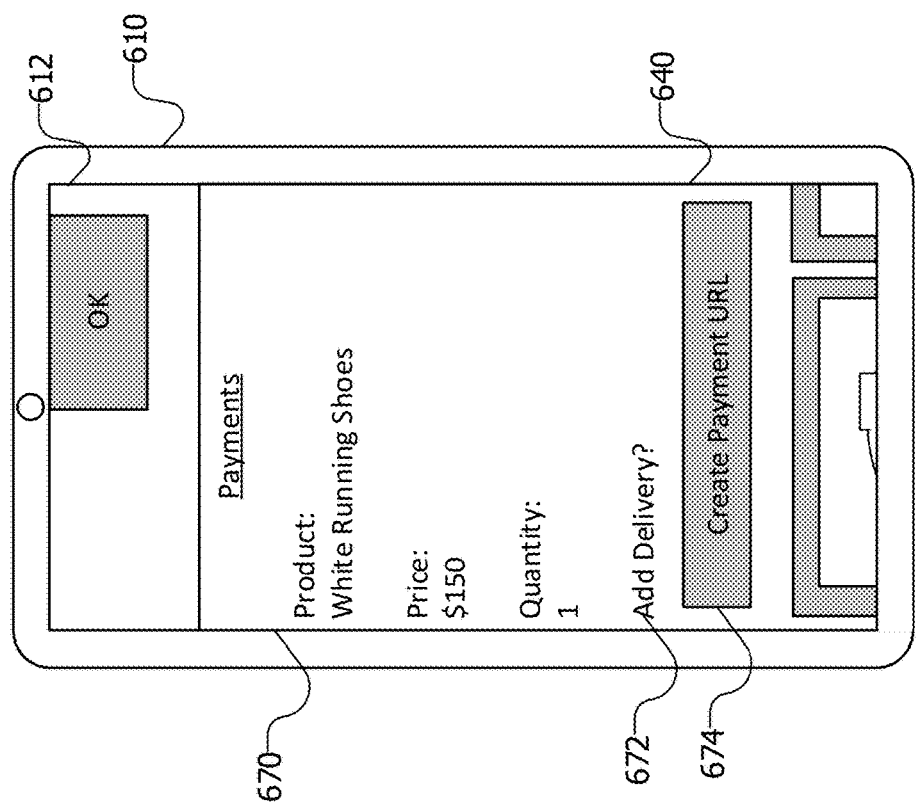
FIG. 8A
FIG. 8

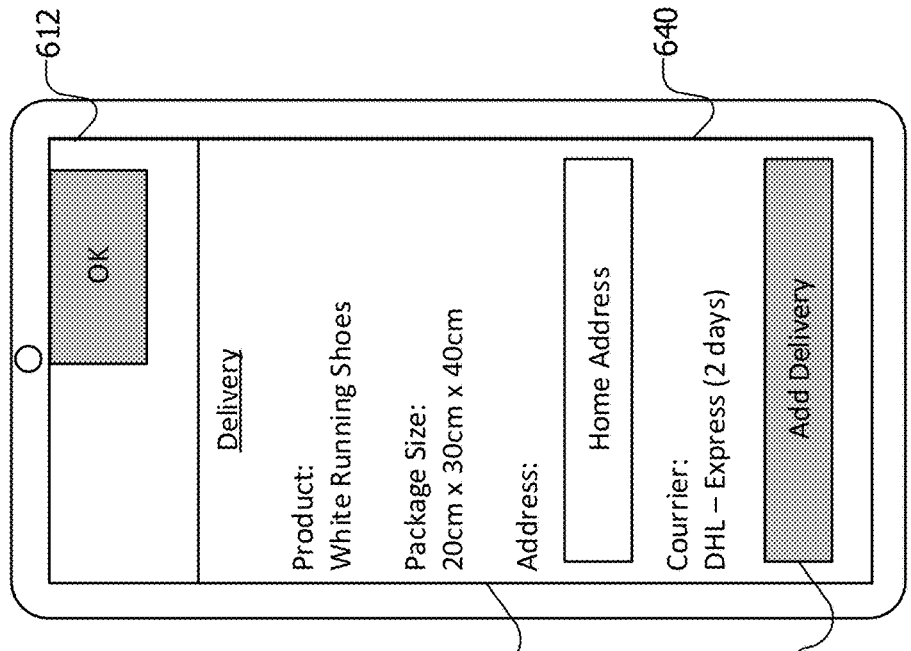
FIG. 9B
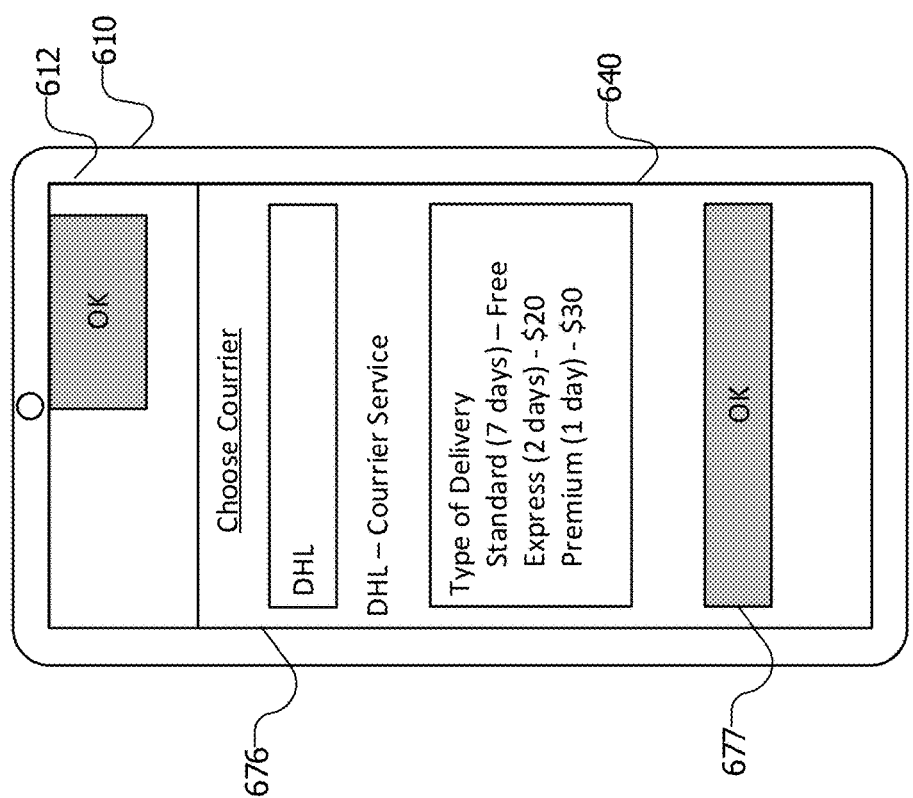
FIG. 9A
FIG. 9

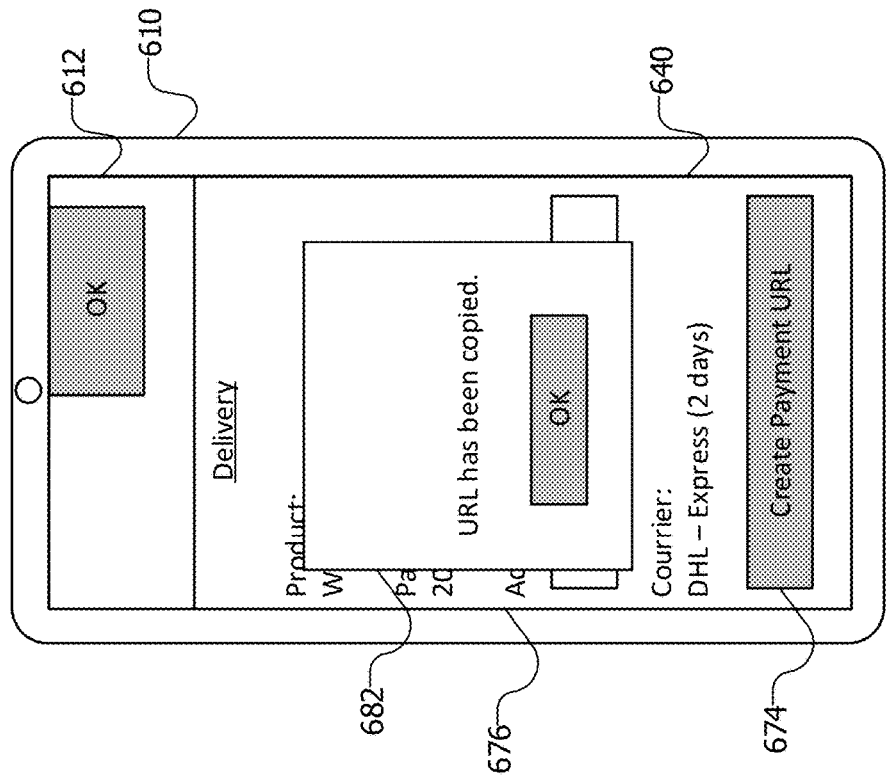
FIG. 10B
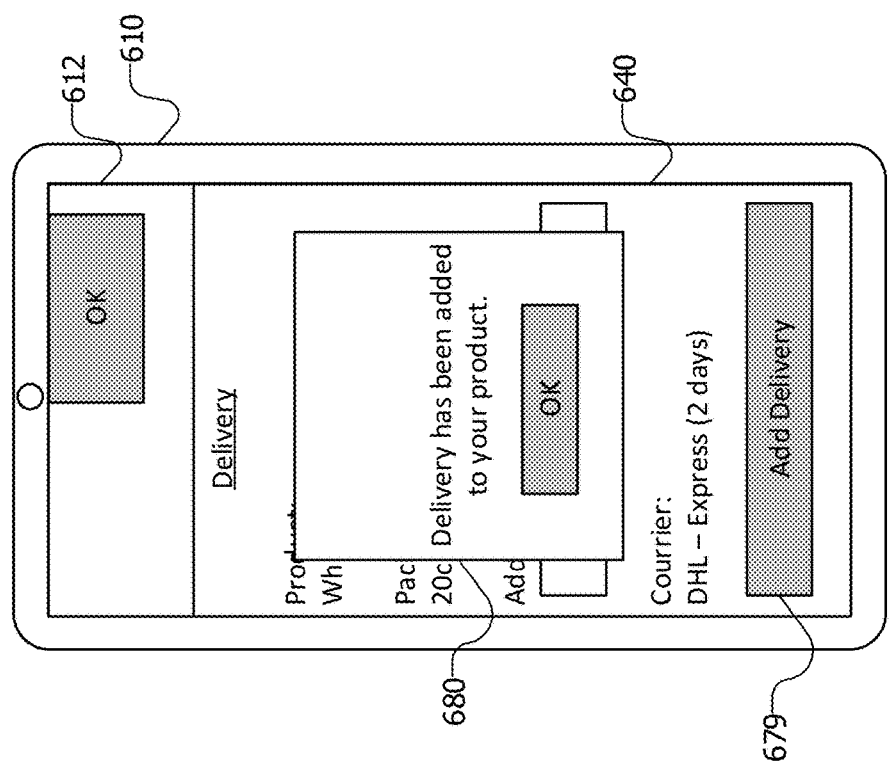
FIG. 10A
FIG. 10

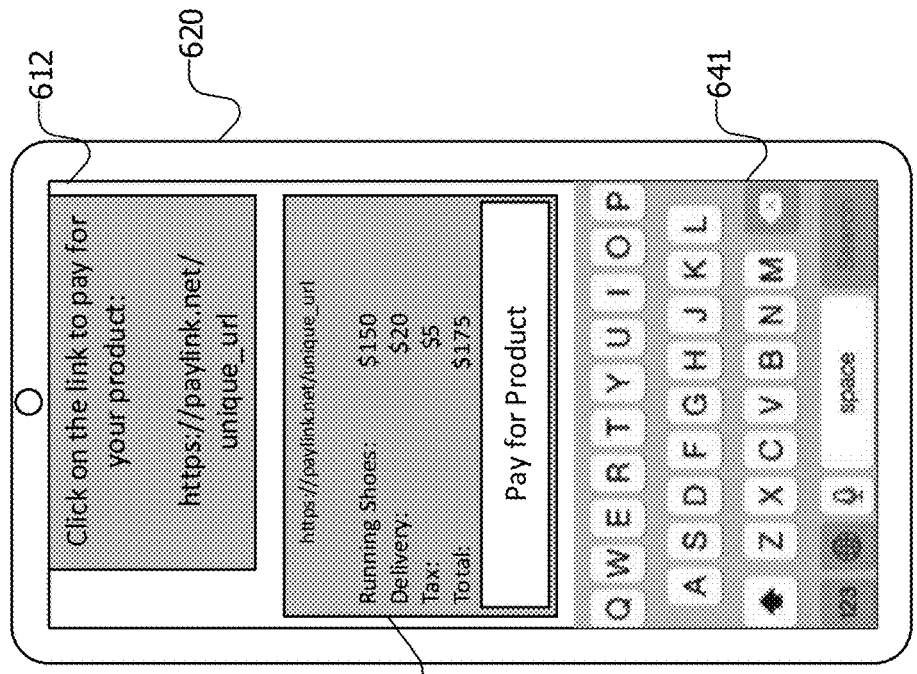
FIG. 11B
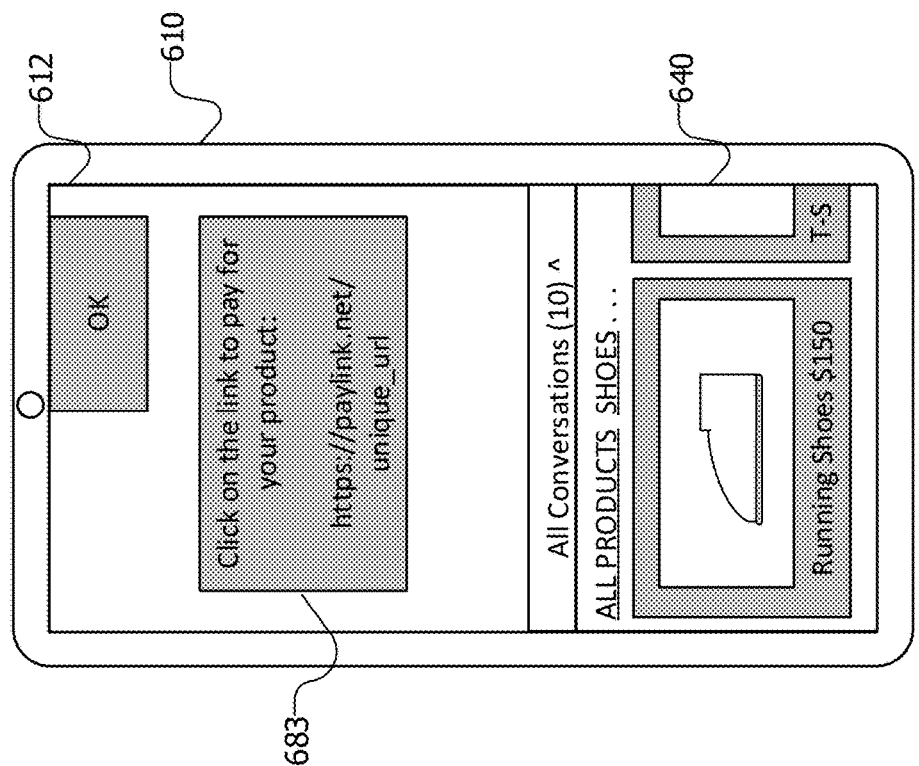
FIG. 11A
FIG. 11

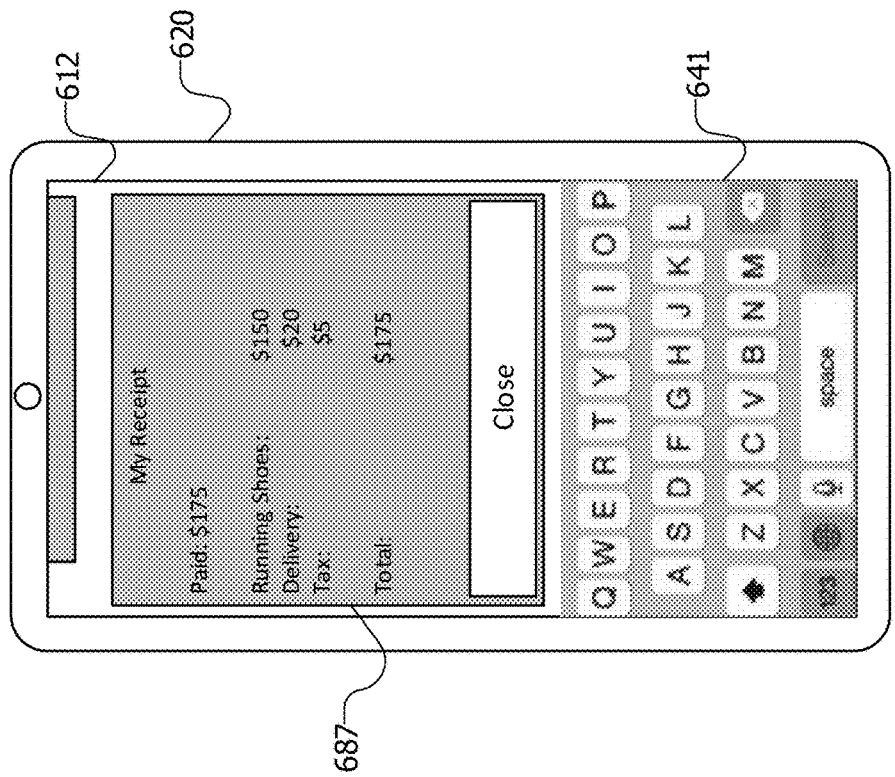
FIG. 12B
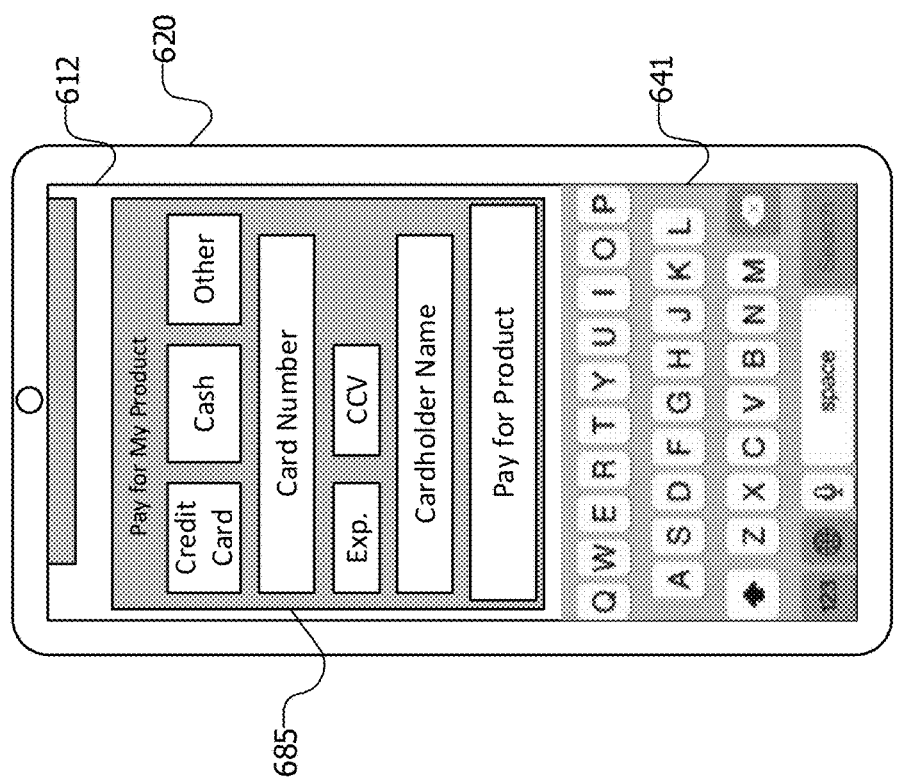
FIG. 12A
FIG. 12

MOBILE DEVICE KEYBOARD INTEGRATED SALES PLATFORM

RELATED APPLICATION INFORMATION

This patent claims priority from U.S. provisional patent application No. 62/791,157 filed Jan. 11, 2019 and entitled "MOBILE DEVICE KEYBOARD INTEGRATED SALES PLATFORM."

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to sales of products and services using only a mobile device and, more particularly, to a mobile device keyboard integrated sales platform.

Description of the Related Art

Sales over the internet have exploded over the last fifteen years. Amazon.com is one of the world's most valuable companies. However, increasingly, individuals rely only or primarily upon their mobile devices to conduct business and everyday life. This is particularly true in countries whose economies developed after the "computer revolution" of the 1990s. In those countries, such as those in Asia, Africa, and South America, many internet users do not even own or have access to a traditional desktop or laptop computer. Their only interaction with the internet may be through mobile devices such as Android and Apple mobile phones.

At the same time, a younger generation of mobile device users are less accustomed to destination shopping. Instead, they rely upon links shared from their friends, influencers in online videos, social networks, and direct links provided by other sources for information about products and services to purchase. In that context, these consumers are potentially less loyal to particular retail outlets and instead prefer to rely upon opinions of individuals they know or whom they trust.

As a result, sales to those individuals have been more difficult than in prior generations of users. It would be desirable if there was a way in which a robust, high-quality and easy sales solution could be provided to sales associates or individuals wishing to sell products using primarily a mobile device, potentially within a "chat" or "social network" environment. It would be even better if that system did not require users to use multiple applications or web pages in order to provide a robust sales experience.

DESCRIPTION OF THE DRAWINGS

FIGS. 6A and 6B, shows user interfaces during a mobile device sales interaction.

FIG. 7, including of FIGS. 7A and 7B, shows other user interfaces during a mobile device sales interaction.

FIG. 8, including of FIGS. 8A and 8B, shows other user interfaces during a mobile device sales interaction.

FIG. 9, including of FIGS. 9A and 9B, shows other user interfaces during a mobile device sales interaction.

FIG. 10, including of FIGS. 10A and 10B, shows other user interfaces during a mobile device sales interaction.

FIG. 11, including of FIGS. 11A and 11B, shows other user interfaces during a mobile device sales interaction.

FIG. 12, including of FIGS. 12A and 12B, shows other user interfaces during a mobile device sales interaction.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The present application proposes using a multifunction alternative keyboard to perform sales functions, communications, product listing, and other functions. In particular, the alternative keyboard may incorporate numerous functions including providing access to a database of products that may be offered for sale from within a chat and providing the ability to generate links that enable the purchaser on the other side of the chat to click and immediately complete the sale for the identified product. These and other functions are possible from within the alternative keyboard without leaving any chat application or in a stand-alone chat application.

The primary benefit of an alternative keyboard is that it can extend the functionality of any chat application to enable it to perform functions like product look-up, hyperlink generation for product review by a potential customer on the other end of a chat, hyperlink generation for sales or point of sale processing. The sales associate or other individual providing this information to the other chat participant need not even leave the chat application. Further, alternative keyboards with extended functionality are acceptable to both Android and Apple app stores. Therefore, the system can be truly cross-platform.

Description of Apparatus

Figure 1:
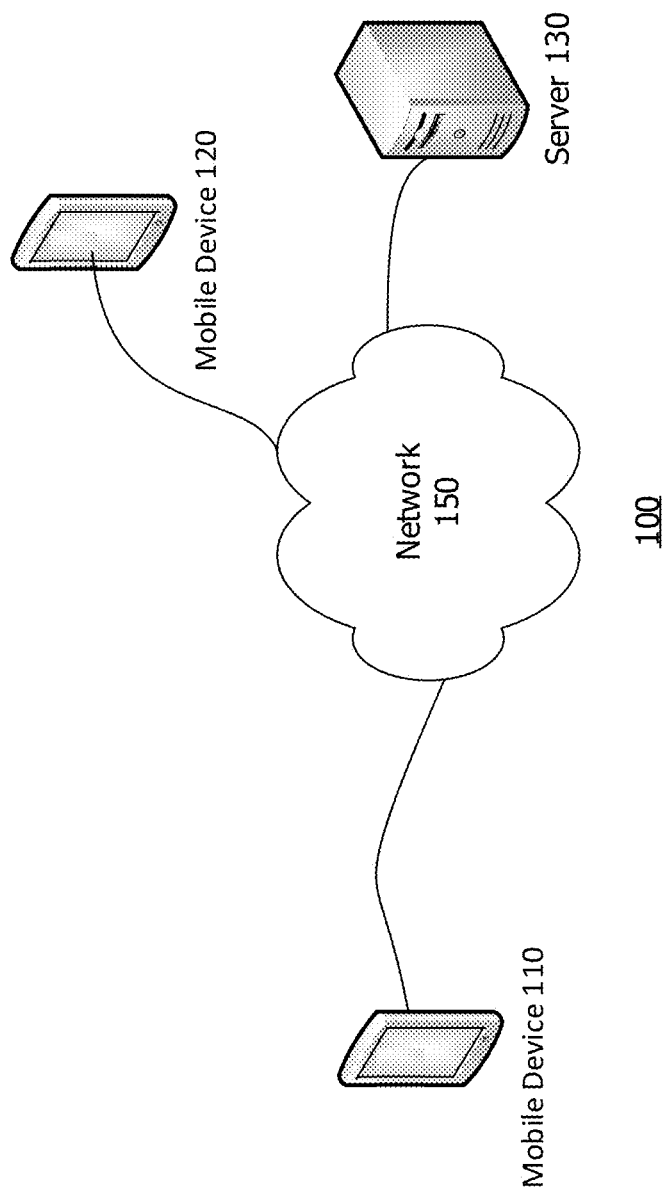
FIG. 1 is a diagram of system for implementing a mobile sales platform.

Referring now to FIG. 1, a diagram of system 100 for implementing a mobile sales platform is shown. The system 100 includes two mobile devices 110, 120, and a server 130 interconnected by a network 150.

The mobile devices 110 and 120 are computing devices (FIG. 3) that include a display and some connection to the network 150. The mobile devices 110 and 120 are largely interchangeable, but are presented separately for illustrative purposes to indicate that one mobile device, e.g. mobile device 110, may be that of a seller and another mobile device, e.g. mobile device 120, may be that of a buyer.

The server 130 is another computing device (FIG. 2) that may be involved in the mobile sales process. For example, the server 130 may store data or contain databases related to products, customers, chat connections, shipping information or tracking, and other sales-related data. Though shown as a single server, server 130 may be one or more physical computing devices and may be located in one location or many locations. In some cases, server 130 may be dynamic, scaling up and down in size and capabilities as-needed and may be implemented on one or many physical devices at any given time in one or many physical locations. The systems and methods described herein may be implemented as a software-as-a-service model reliant upon standardized hardware provided and maintained by third parties, but that enable software to operate thereon for a fee.

The network 150 may be or include the internet. The network 150 may also include other protocols such as Ethernet, Bluetooth®, 802.11x wireless protocols, telephone-specific protocols such as GSM, 3G, 4G, and 5G wireless telephony, or still others to perform some or all of the communications functions between the various devices connected to the network 150 as described herein.

Figure 2:
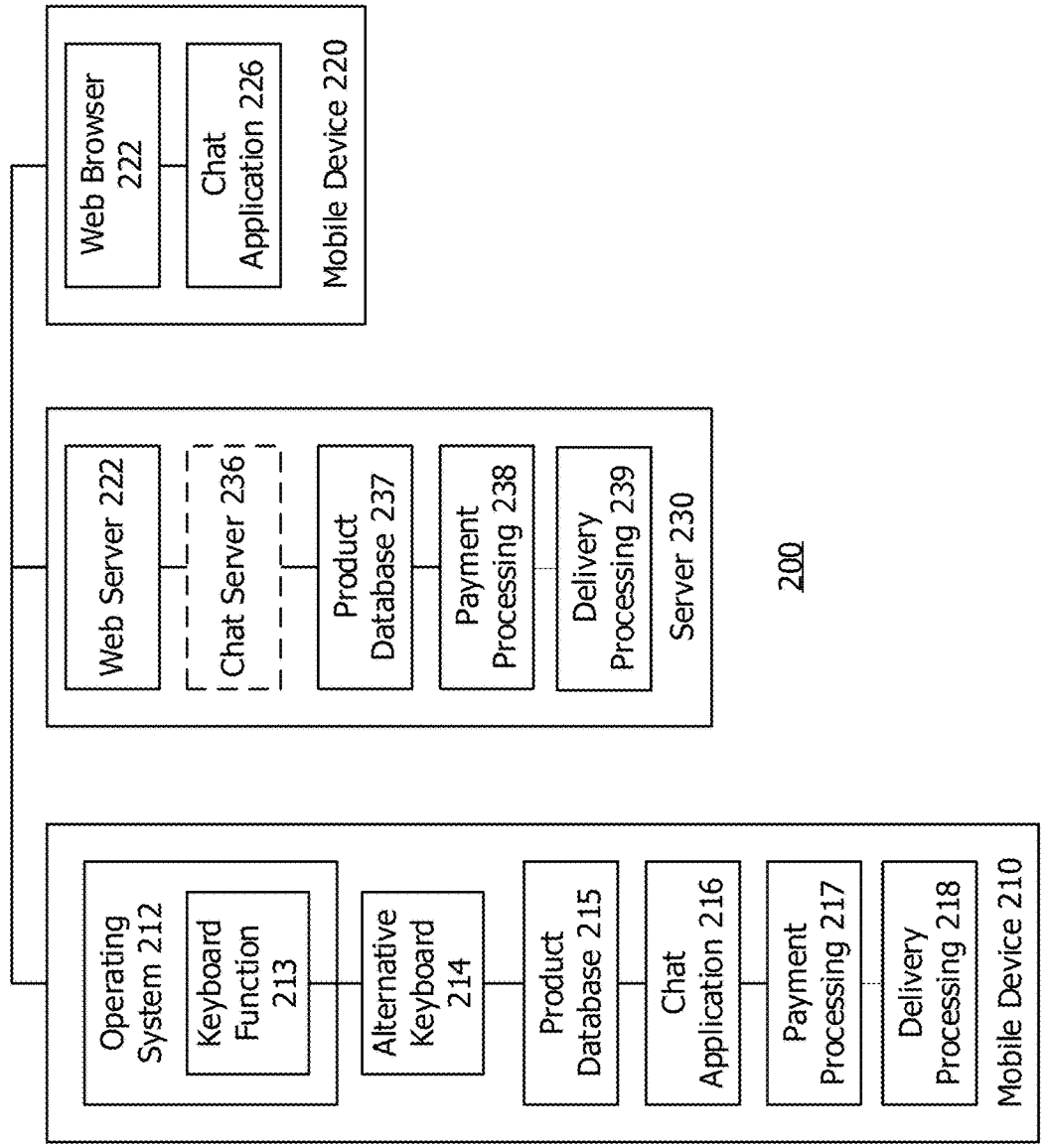
FIG. 2 is a functional diagram of a system for implementing a mobile sales platform.

FIG. 2 is a functional diagram of a system 200 for implementing a mobile sales platform. The system 200 is identical to that shown in FIG. 1, except this is a functional diagram, showing the functional components of each of the mobile device 210, the mobile device 220 and the server 230.

The mobile device 210 includes an operating system 212, including a keyboard function 213, and an alternative keyboard 214, a chat application 216, payment processing 217, and delivery processing 218.

The operating system 212 is representative of mobile device operating systems such as iOS®, iPadOS®, Android®, HarmonyOS®, Windows®, MacOS®, Linux, and other, similar operating systems. The operating system 212 need not, necessarily, be a mobile operating system, but merely one that operates upon or is capable of operating upon a mobile device such as a mobile phone, a table or handheld computer, or other, similar device. In some cases, other device form factors that incorporate on-screen keyboards would also be suitable, including even traditional desktop computers. The operating system generally provides a file structure, memory management, allocation of processes for multitasking, and various other functions for a mobile device. But, one of those functions in a typical, modern operating system is providing a keyboard function 213.

The keyboard function 213 is usually a set of on-screen keys that provide functionality. The most basic functionality is to enable typing using a keyboard. For example, Western, English-speaking countries typically use a so-called QWERTY keyboard, though other keyboard formats are also used. Other countries use different keyboards depending upon their alphabets. Other keyboards have also been used, for example, emoji keyboards or keyboard keys have been common for many years. Typically, these keyboards are a standard, non-alterable part of the operating system 212.

More-recently, the keyboard function 213 has been augmented with the capability to accept and use third-party keyboards. They are third-party only because they are non-standard and may be, but need not necessarily be, created by entities other than those who create the operating systems. Different operating system providers operate differently in terms of how those keyboards are implemented, but iOS® for example, by Apple® enables users to install limited-function "apps" that function as keyboards. Many of the earliest iterations of these third-party keyboards were to search for and post images in chats for comedic effect. Others included "stickers" that could be pasted on chat windows between friends. Still others were so-called high-speed keyboards that enable higher-speed typing of messages or short-cut messaging.

Regardless, the keyboard function 213 may be extended to other uses and has already been shown to be a flexible medium in which to operate. Users may use these third-party keyboards in any application, including email applications, chat applications, web browsing applications, or virtually anywhere where an on-screen keyboard may be presented to a user of the mobile device.

The alternative keyboard 214 is one such third-party keyboard, though, it may be integrated directly into an operating system in some iterations of the concept. The alternative keyboard 214 is a keyboard plugin that uses the keyboard function 213 to provide extended functionality to the mobile device 210 in the form of a keyboard. The availability of the alternative keyboard 214 integrated with the keyboard function 213 in any chat window or other location provides numerous benefits which will be discussed herein.

The capability of the alternative keyboard 214 to extend the functionality of a typical chat window by enabling functions that have typically been limited to independent applications will be discussed more fully below. The primary functions provided for by the alternative keyboard 214 are integration with a chat application 216 and the addition of payment processing 217 and delivery processing 218 all within one chat window, with easy access by a user.

The product database 215 is software that implements a database of information relating to products. The product database 215 may only be on the mobile device 210 or may be accessed remotely (e.g. on server 230) in order to obtain its relevant data. In such a case, the product database 215 may only be a conduit through which information relating to products is obtained. The product database 215 may incorporate pictures, descriptions, SKU numbers, prices, sales and inventory information, and other, similar information related to products available for sale, either from a single user of mobile device 210 or to all sellers using the alternative keyboard 214.

The chat application 216 is software that implements a typical chat application that enables peer-to-peer communications between at least two people, such as Facebook Messenger®, Apple® Messages®, Android® Chat, Insta-Gram® direct messaging, Twitter® direct messaging, LinkedIn® messaging, WhatsApp®, or any other chat application that works using the keyboard function 213 into which the alternative keyboard 214 can be added. The chat application 216 is called a chat application, but may only be a small function within a larger application such as an entire social network, web forum, news aggregator, or other online community where individuals may communicate with one another. For example, the chat application 216 may be or be within Facebook®, Twitter®, Reddit®, internet relay chat, Usenets, large web forums related to particular products (e.g. Jeep forums, or forums for fans of certain shoes) or services (e.g. NBA fans, or FIFA fans), and other websites and mobile or PC applications that enable communications. The chat application 216 may be stand alone or a part of another application, but the functions described herein operate equally well in pre-existing chat applications or special-purpose chat applications. Regardless, the alternative keyboard 214 is integrated with the chat application 216.

The payment processing 217 is software that implements a system for enabling payment by one chat participant to another chat participant. In a typical case, that will be from mobile device 220 to mobile device 210, because mobile device 220 is that of a prospective purchaser and mobile device 210 is that of a prospective seller, who may act as a digital shopkeeper, in the examples discussed herein. Though, the example shown is only illustrative. All of the functions shown and described for both mobile devices 210 and 220 may be on either mobile device 210, 220.

The payment processing 217 is software that enables one or more payment types to be used to pay for potential products. These payment types may include credit cards, cash or cash-like alternatives, cryptocurrencies or blockchain-based currencies or wallets, and online payment processing services like Paypal, Venmo® and others. And, other payment systems are envisioned as well. For example, subscription models may be used, cryptocurrencies may be used, trust accounts or escrow accounts may be used to facilitate purchases by individuals who may not have access to or may prefer not to use credit cards or other online payment systems. These and various other payment systems may be used as a part of payment processing 217, depending on the specific needs of the prospective purchaser or prospective seller or in some cases the brands or products being sold. The function of the payment processing 217 will be discussed more fully below.

Delivery processing 218 is software that enables the acceptance, storage, and use of information for processing orders placed using the alternative keyboard 214. The delivery processing may provide forms that are fillable by a seller and/or a buyer to complete a transaction and to enable orders to be processed and, once completed, shipped to a purchaser.

The mobile device 220 includes a web browser 222 and a chat application 226. The web browser 222 may be used, as disclosed in more detail below, to render aspects of the information provided in a chat window. However, the web browser 222 more generally is a rendering engine capable of converting data such as web pages (e.g. html, css style sheets, etc.) into viewable content. Since web content is so ubiquitous, modern web browsers 222 often are built directly into the operating systems of mobile devices like mobile device 220 so that web page rendering can be completed in almost all context.

The mobile device 220 may also include a chat application 226 that is used to communicate with the chat application 216 of mobile device 210 to discuss and complete sales of desired products.

The server 230 includes a web server 222, optionally a chat server 236, a product database 237, payment processing 238, and delivery processing 239.

The web server 222 is software that may serve content related to products, if product information is stored on the server 230, to the mobile device 210 and/or to the mobile device 220. The web server 222 may serve that information in the form of actual web pages, but more likely may provide data in a form expected by the alternative keyboard 214 which may or may not be a web page and may, for example, be some form of scripting language, extensible markup language, or other database format.

The server 230 may optionally include a chat server 236 which is used to facilitate communications between the chat application 216 and the chat application 226. The chat server 236 is optional in the sense that it may or may not be a part of the server 230. Further, the server 230 itself may not be a single server, and the chat server 236 may be operated or maintained by virtually any other entity.

The product database 237 is software that stores information related to products for sale. The types of information that may be stored are discussed above. The product database 237 may store information for a plurality of users simultaneously and serve it to any number of potential sellers and buyers upon request.

The payment processing 238 is software that implements payment processing for purchasers and buyers to ensure that credit cards, cash or cash-like services, or other payment services accurately process and track payments made and received. Payment processing 238 may integrate with one or more external payment processing systems in order to implement the payment functionality.

As indicated above, the payment processing 238 (like payment processing 217) may take many forms. The primary purpose is to enable the digital exchange of value for value. That exchange may take forms of currency or credit exchange which are common like credit cards, debit cards, automatic clearinghouse (ACH) transactions, checks (digital or physical), or digital currency exchange functions like Venmo®, PayPal®, Square® Cash, or other similar systems or services. However, other forms of value exchange also are suitable for this system. For example, an escrow account, managed by the operator of the payment processing 238 or by a third party, may accept payment at another location and hold shipment of the product until that payment is received. Such escrow services may ensure payment can be made for individuals who do not necessarily have access to credit cards or other digital payment mechanisms.

Still further, subscription models of payment whereby a prospective purchaser subscribes to a services that ensures, for example, a monthly delivery of a set of clothing suitable to that purchaser's tastes. The payment processing 238 may accept that kind of payment, whereby payment is not for the product itself, but for a subscription to what may be many products with ongoing payments resulting on ongoing products. In other cases, the payment processing 238 may merely serve as a proof or origination point for a contract to pay and to deliver the product externally from the overall system itself. In those cases, the contracts may be fulfilled fully "offline" while the proof of the agreement is maintained digitally within the payment processing 238.

Delivery processing 239 is software that enables processing and handles the labelling of merchandise that is sold so that it may be shipped to a purchaser. Delivery processing 239 may be a third party drop shipping service or warehousing service that stores product for sale and shipment and then sends the product to purchasers as it is purchased. In small-scale shops implemented as described herein, no delivery processing 239 may be provided, with all of that handled by the user of the mobile device 210.

Delivery processing 239 may also contain information about past purchases or ongoing purchases to enable a seller to consider cross-selling—selling related products or different products during the course of a sale or after a sale—while in the midst of a transaction or after a transaction has completed. An example would be attempting to sell socks or a different pair of shoes to a past or current purchaser of shoes. Delivery processing 239 may also incorporate automatic or "suggested" cross-selling. For example, the delivery processing 239 may incorporate emails or texts or other communications in a sales receipt or delivery confirmation or shipment notification that identify products that a purchaser who has already completed a purchase may be interested in based upon that completed purchase.

Figure 3:
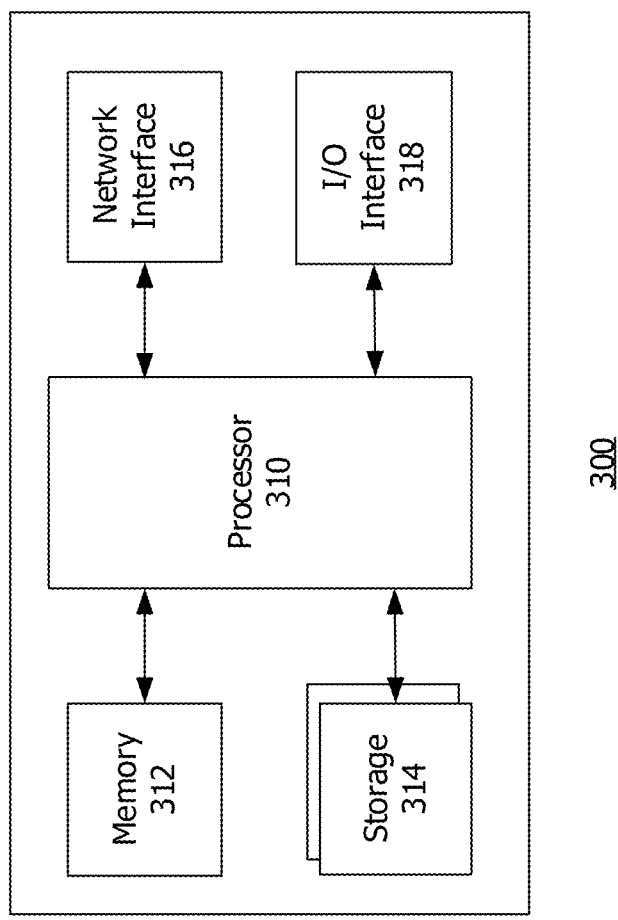
FIG. 3 is a block diagram of a computing device.

Turning now to FIG. 3, a block diagram of a computing device 300 is shown. The computing device 300 may be representative of the server computers, client devices, mobile devices and other computing devices discussed herein. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 310 coupled to a memory 312, storage 314, a network interface 316 and an I/O interface 318. The processor 310 may be or include one or more microprocessors and application specific integrated circuits (ASICs).

The memory 312 may be or include RAM, ROM, DRAM, SRAM and MRAM, and may include firmware, such as static data or fixed instructions, BIOS, system functions, configuration data, and other routines used during the operation of the computing device 300 and processor 310. The memory 312 also provides a storage area for data and instructions associated with applications and data handled by the processor 310. As used herein, the word memory specifically excludes transitory medium such as signals and propagating waveforms.

The storage 314 may provide non-volatile, bulk or long-term storage of data or instructions in the computing device 300. The storage 314 may take the form of a disk, tape, CD, DVD, SSD, or other reasonably high capacity addressable or serial storage medium. Multiple storage devices may be provided or available to the computing device 300. Some of these storage devices may be external to the computing device 300, such as network storage or cloud-based storage. As used herein, the word storage specifically excludes transitory medium such as signals and propagating waveforms.

The network interface 316 is responsible for communications with external devices using wired and wireless connections reliant upon protocols such as 802.11x, Bluetooth®, Ethernet, satellite communications, telephone-specific protocols such as GSM, 3G, 4G, and 5G wireless telephony, and other protocols. The network interface 316 may be or include the internet.

The I/O interface 318 may be or include one or more busses or interfaces for communicating with computer peripherals such as mice, keyboards, cameras, displays, microphones, and the like.

Description of Processes

Figure 4:
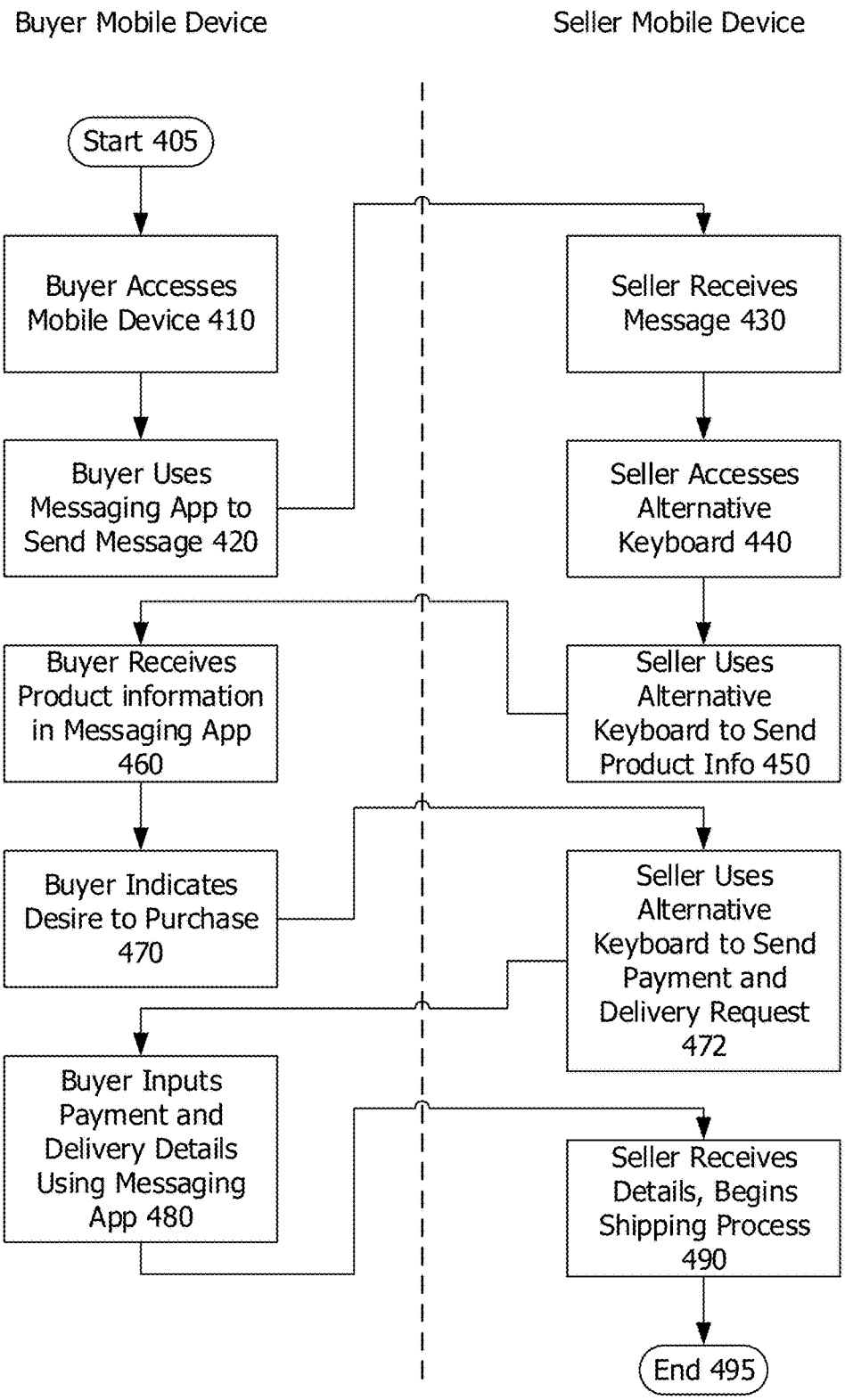
FIG. 4 is a flowchart of a typical sales interaction using a mobile device and alternative keyboard.
Figure 5:
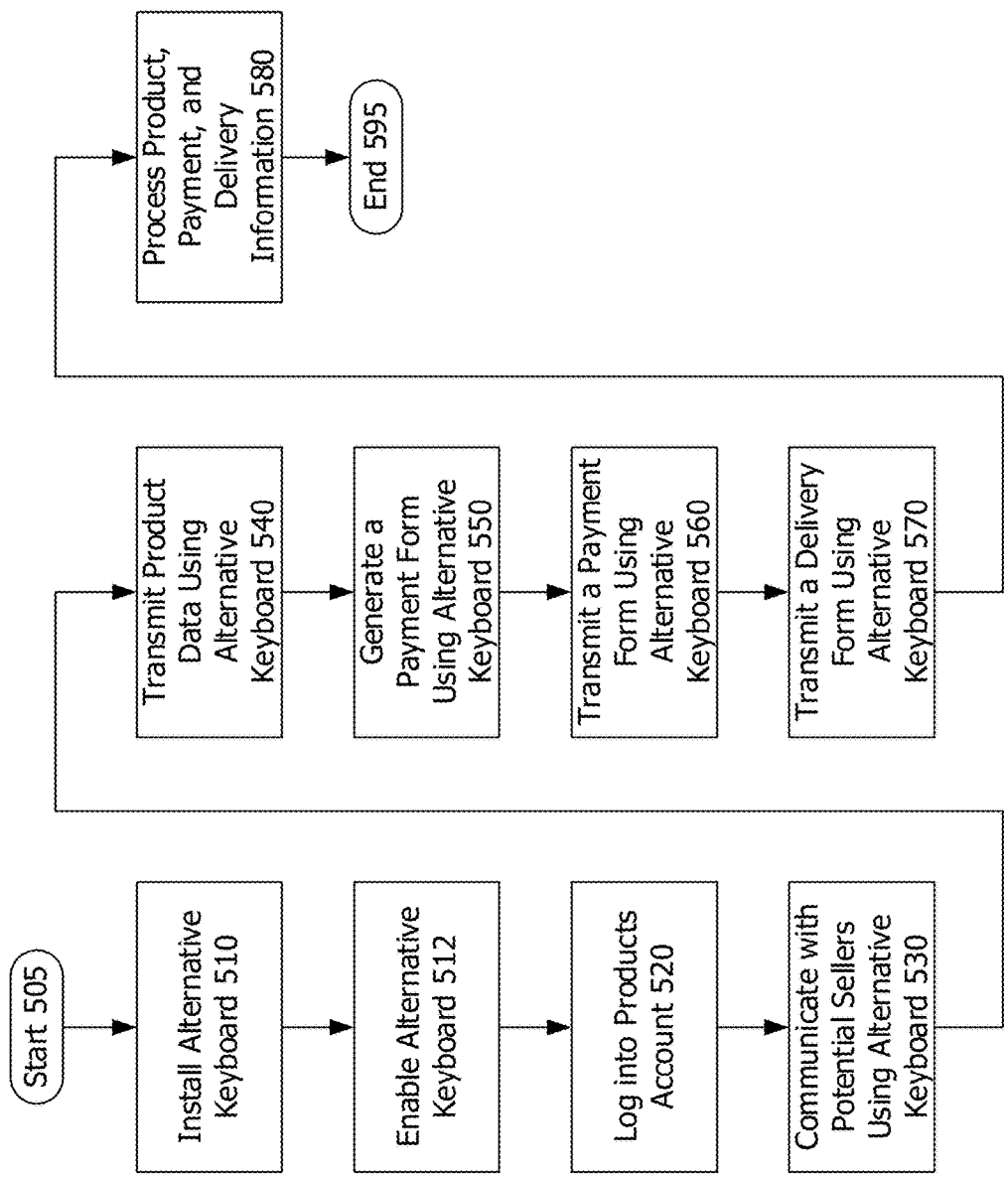
FIG. 5 is a flowchart of the functions of an alternative keyboard in the process of a sales interaction.

Referring now to FIG. 4, a flowchart of a typical sales interaction using a mobile device and alternative keyboard is shown. This flowchart is focused on user interactions, so that the overall process can be better understood. The following FIG. 5 is focused on the functional interactions and actions of the devices disclosed herein. The flowchart has a start 405 and an end 495, but can progress many times through the process, and a given seller or buyer may be involved simultaneously in multiple interactions such that either a buyer or a seller may simultaneously be at various parts of the overall flowchart. FIG. 4 is divided into halves. The left half shows actions taken by a prospective buyer's mobile device. The right half shows actions taken by a prospective seller's mobile device.

Following the start 405, a buyer accesses his or her mobile device 410. This access may include any number of actions such as perusing an Instagram® account of a favored influencer, chatting with a friend using a chat application, or simply browsing websites and articles. A buyer may see a product that he or she is interested in, for example, on an influencer's Instagram® feed.

Thereafter, a buyer may use a messaging application to send a message to the influencer at 420. Since the product was spotted on Instagram®, the message may be sent as a direct message using Instagram®. This is convenient because it flows naturally for the prospective buyer. He or she need not click any links or go to eBay® or visit a web page or otherwise engage any other application or website to begin the sales process. Instead, the prospective buyer simply begins the sales process right where the product was discovered.

In other cases, the product may be seen first in a text chat or the web page or elsewhere. In such cases, chat functionality built into those places may enable this interaction in much the same way. One of the goals of this system is to ease the sales process such that any chat, at any time, can become an easy and easily manageable sales channel for a prospective seller. Even a chat box on a typical web page could be the place where a chat using the present system and methods as described herein begins.

The seller receives the message at 430. The message may be as simple as a request seeking additional information on the product or confirmation that the product is still in stock.

Figure 6:
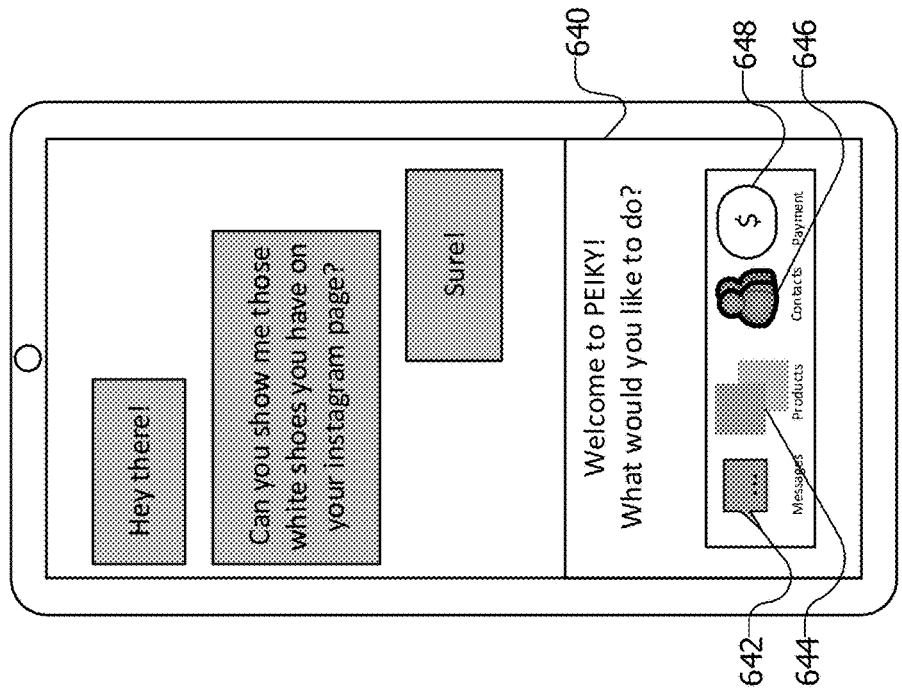
FIG. 6, including
Figure 6:
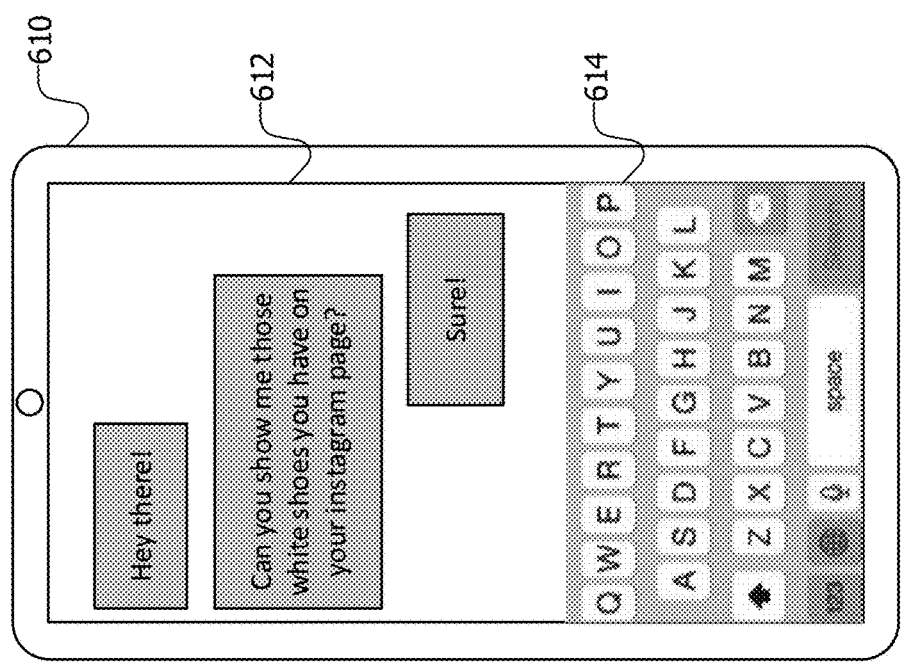

An example of such an interaction is shown in FIG. 6, including FIGS. 6A and 6B which show user interfaces during a mobile device sales interaction. In FIG. 6A, the seller's mobile device 610 is shown, with a typical standard keyboard 614. The chat window 612 shows a series of chat messages from the prospective buyer (left) and a response from the seller (right).

Returning to FIG. 4, the seller accesses the alternative keyboard so as to respond to the buyer's inquiry. This is also shown in FIG. 6B, where the standard keyboard 614 has been replaced with an alternative keyboard 640. This keyboard sits in the same area as the standard keyboard 614, but offers additional functionality, as discussed above. Specifically, it includes a messages function 642 wherein a prospective seller can switch between different chat applications and between different conversations with various prospective buyers at any time. The messages function 642 may also maintain a history of all chats so that a seller can keep a record of the sales that have taken place. This also serves as a record of the sales in the sense that it is where the purchases, receipts, and shipping and delivery information were obtained and confirmed with payment.

The alternative keyboard 640 also includes a products database access 644. The products database access 644 is an organized listing of all products that a seller has made available for purchase. Selecting the products database access 644 provides access to the seller so that he or she may link or provide information and images about available products directly in a chat.

The alternative keyboard 640 also includes a listing of contacts 646. These are contacts 646 with whom the seller has interacted or that are otherwise available on the mobile device 610. A history of interactions and sales may be stored in connection with each of the contacts 646

Finally, the alternative keyboard 640 also includes a payments 648 function. This function enables the user of the alternative keyboard 640 to view old payments, process refunds or returns, and to create payment links for prospective purchasers that may be shared directly in a chat with a prospective purchaser.

Returning to FIG. 4, the access to the alternative keyboard is implemented in various ways depending on the type of operating system used. In iOS® using Apple® products, a user may install any number of alternative keyboards. They are accessed using a specialized button which changes, iteratively, through keyboards that are installed. In this way, a seller can use the standard keyboard to actually chat with a prospective purchaser, then switch dynamically to the alternative keyboard to engage in sales-related activities, linking products, creating sales links, sharing product information, and in accepting payments. In other operating systems, e.g. HarmonyOS® or Android®, one must install a keyboard. In those operating systems, the keyboards are given a bit more power within the operating system, but operate substantially the same. A user may elect to have an alternative keyboard for all purposes, or only for certain applications. And, one may switch between available software keyboards general at will through interaction with the on-screen keyboard. Full-scale personal computer operating systems like Windows®, MacOS®, and Linux provide similar functionality for on-screen keyboards as well.

In a typical interaction, a seller may use the alternative keyboard to send product information at 450. An example of this is shown in FIG. 7, including FIGS. 7A and 7B which show other interfaces during a mobile device sales interaction. Specifically, in FIG. 7A, after a user accesses the alternative keyboard 640, then selects the products database access 644 (FIG. 6), the alternative keyboard 640 shows the contents of the products database in place of the alternative keyboard 650. There may be various categories 650 of products to aid a user in selecting a particular product. Further, product entries 652, 653 in the database for various products may also be shown. A seller may click on one of those product entries 652 to copy the data, link, pricing, and/or images for pasting in a chat 612, or to automatically provide a dynamic link in the chat 612.

Then, the product entry 654 appears in the chat 612 and is received by the buyer in the buyer's messaging app at 460 (FIG. 4). The prospective buyer may view the content, click on any links, scroll through images, or otherwise view the potential product. The integrated web browser that is accessible in most modern operating systems plays a role here. In most chat applications, web pages maybe rendered dynamically within the chat. Sometimes, only a subset of the content is available for viewing within the chat, but in many cases, it is sufficient to convey information to confirm that the product is the product that the buyer wishes to purchase, to convey the price for the item, and to provide a clear record of the product and price being purchased for confirming what the prospective buyer and seller are engaged in transacting.

Because a series of transactions may be taking place simultaneously, a tab for all conversations 660 may be visible to a seller, as shown in FIG. 7B. In this way, a seller can transition from sale to sale quickly to engage multiple potential purchasers at the same time.

Next, the buyer may indicate a desire to purchase the product at 470 (FIG. 4). This interaction is reflected in FIG. 7B, wherein the user indicates in the chat window 612 a desire to purchase the identified product.

Thereafter, the seller may use the alternative keyboard to send payment and delivery request to the buyer for confirmation and payment at 472. That process is shown beginning in FIG. 7B and continuing through FIG. 11A. Each of FIGS. 8A-11A, show user interfaces of a seller mobile device. These figures and the associated processes will be discussed in turn below.

First, in FIG. 7A, after a seller has shared the product information in chat, an overlay 655 may show the seller that it has been shared. As a chat moves on, the product image may disappear above in the chat. So, it is helpful to a prospective seller to know that it has already been shared.

Once a product is shared, a sell button 656 may appear over a shared product. In this way, the alternative keyboard helps to confirm that the buyer and seller are operating upon the same product and avoids the seller accidentally selling a product that a buyer has not seen in the chat. As a part of this sell operation that is invoked using the sell button 656, the seller may elect to alter the default price for the item using a pricing change menu 654. During the course of discussions about the product, a buyer may request a discount. A potential seller may or may not agree, but if one is agreed upon, then it may be reflected here before the seller uses the sell button 656.

FIG. 8, including of FIGS. 8A and 8B, shows further user interfaces of the seller's alternative keyboard under the sell functions. These screens are generated after the user selects the sell button 656 above. First, the product is identified in the payments section 670 along with the price and quantity of the item. This is much like any other sales process. However, it is all a part of the alternative keyboard 640, not any other application or website. Notably, the chat window 612 is still visible. In this way, the seller may engage in this process all while within the chat application.

Here, the seller may elect to add delivery at 672 which opens another dialogue (shown in FIG. 8A). The seller may use the create payment URL button 674 to generate a payment URL. This process is discussed below.

Turning to FIG. 8B, assuming the seller wishes to add delivery, a further dialogue appears wherein, still within the chat window 612 on the mobile device 610, the seller may use the alternative keyboard to generate delivery information. The seller (or buyer at a later step) may input delivery information and choose a courier 678 to deliver the product.

Turning to FIG. 9, FIG. 9A shows how a selection of the courier in the delivery dialogue 676 may take place, as well as the selection of a particular kind of delivery (e.g. express or ground), all using the alternative keyboard 640 within the chat window 612. Once settings are selected, the seller may select OK 677 to complete those selections.

Turning to FIG. 9B, once the settings are set, the seller may review those settings in the delivery dialogue 676. If everything appears acceptable and correct, then the seller may select the add delivery button 679 to complete the addition of delivery options for the purchase.

Turning to FIG. 10, including FIGS. 10A and 10B, other user interfaces during a mobile device sales interaction are shown. First looking to FIG. 10A, a confirmation dialogue 680 that delivery has been added is provided to the seller in the alternative keyboard 640 that is a part of the chat window 612. Thereafter, in FIG. 10B, the user may select the create payment URL button 674 which results in the generation of a confirmation dialogue 682. Here, the confirmation dialogue 682 shows that a URL has been copied (e.g. the URL for the payment). In other cases, the payment URL may automatically populate the chat upon selection of the create payment URL button 674.

Turning to FIG. 11, including FIGS. 11A and 11B, other user interfaces during a mobile device sales interaction are shown. FIG. 11A shows the chat window 612 with the payment URL 683 that was sent to the prospective buyer in the chat. The URL is shown as an actual URL. The alternative keyboard 640 has returned to its typical state showing the products available for purchase and enabling the user to transition to other conversations taking place about other products for purchase with different potential buyers.

FIG. 11B shows a prospective buyer mobile device user interface. Here, the payment URL 684 has been rendered by the web browser (or integrated web browser functionality) within the chat window of the prospective buyer. Many chat applications render web content directly within the chats, or, at a minimum, provide previews of that functionality. Using this functionality, the prospective buyer may be directed by the payment URL 684 to a separate web page where payment information is processed and entered. However, preferably, the preview and web browser functionality integrated directly into the particular chat application renders the entire URL completely within the chat. In this way, the buyer again need not leave the chat application at all to complete the entire payment process. Notably, a standard keyboard 641 is shown because FIG. 11B is the mobile device 620 of the prospective buyer who may or may not have the alternative keyboard.

After the payment URL is provided to the buyer at 472 (FIG. 4), the buyer may input payment and delivery details using the messaging app at 480. The example shown above had the seller inputting delivery details, but that same functionality may be provided in the payment URL so that the prospective buyer inputs those delivery details, rather than the seller.

FIG. 12, including FIGS. 12A and 12B, shows other user interfaces during a mobile device sales interaction. FIG. 12 shows the process from the buyer's perspective for inputting the payment information and receiving a receipt for payment. FIG. 12A shows a chat window 612 for the mobile device 620 of a prospective buyer. Here, the prospective purchaser, within the chat window 612 itself, may input payment information using a payment information input window 685 that is a rendered web page provided by the payment URL generated by the seller, and elect to pay. FIG. 12B shows the receipt 687 received in that same chat window 620.

Finally, the seller receives details regarding payment, delivery, and shipping for the sale that was completed at 490.

Figure 13:
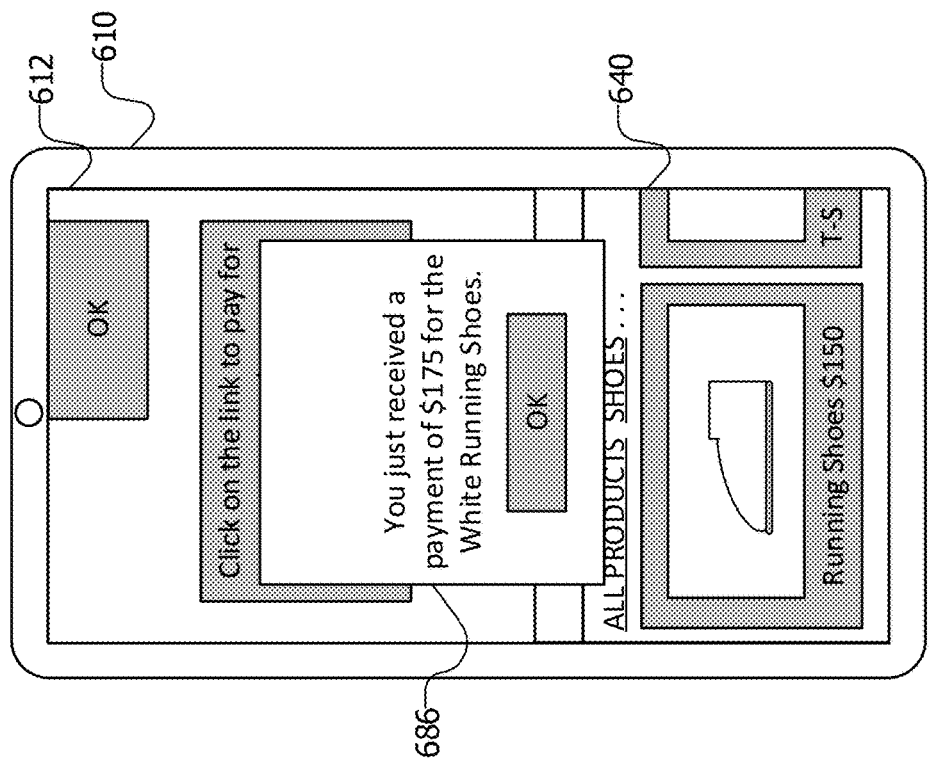
FIG. 13 is another user interface during a mobile device sales interaction.

FIG. 13 is another user interface during a mobile device sales interaction. This figure shows the sellers chat window 612 with a sales confirmation dialogue 686 confirming that payment was received. That information will be stored and may be used to generate shipping labels. The payment will be processed by external payment processors and provided from the buyer to the seller in payment for the product.

Then, the process ends at 495. FIG. 4's discussion with reference to user interfaces and user interactions makes understanding the overall process easier.

Turning now to FIG. 5, a flowchart of the functions of an alternative keyboard in the process of a sales interaction is shown. This flowchart, unlike FIG. 4, is the functions that take place on the mobile device of a seller to cause the various functions to take place. The process begins at 505 and ends at 595, but many instances of the process may be taking place at the same time, each on different steps of the process.

Following the start 505, the prospective seller must install the alternative keyboard on a mobile device at 510. This installation may only be the keyboard itself, as is allowed by some operating systems, or may be installed as a part of an application with other functions. The alternative keyboard may be used along with any other chat application, as desired. If a separate software application is installed, that application may integrate with multiple chat applications and enable use of the alternative keyboard in connection with product sales and chats across multiple chat systems and services.

Once installed, most operating systems require that the alternative keyboard be enabled at 512. This enablement may be selecting the alternative keyboard in a setting as one that may be used interchangeably with other keyboards. Enablement may include the actual process of activating the keyboard for use in connection with a given chat or messaging software.

Next, the seller's mobile device must be used by a seller to log into a products account at 520, which may be an online account that stores product data, assists in processing payments, and/or provides chat functionality. This may be implemented in one or more servers, like server 130 (FIG. 1). This login process may ensure that the correct products are loaded from the products database in the alternative keyboard.

The seller's mobile device may use the alternative keyboard to communicate with potential sellers at 530. The alternative keyboard may incorporate (e.g. through swipes left and right) a standard text-based keyboard so that traditional communication via the messaging application is possible. Alternatively, the seller may transition between the standard keyboard and the alternative keyboard. In this way, the seller may communicate both in words and through links to the product with potential buyers.

The seller may send, using the alternative keyboard, product data through the messaging application at 540. This product data may come from a product database and may include images, textual descriptions, videos, audio, pricing information, schematics, specifications, sizing information, and other product-related information. That data may be drawn directly from a products database and may be transmitted in the form of a URL or in text placed directly within the chat messages. This product data may also include cross-selling data, for example, that this purchaser has previously purchased shoes from this manufacturer or may also be interested in another product based upon this sale. The seller may send that information, if it seems appropriate, to the potential buyer as prompted or suggested by the alternative keyboard.

Next, assuming the prospective purchaser is interested in purchasing one or more products, the seller may use the alternative keyboard to generate a payment form at 550. This process is shown in FIGS. 8-11. This form may incorporate addresses, product information such as type, size, SKU, web forms, web pages, and/or URLs that enable the payment form to accept payment information and delivery information so that the purchase process may be completed.

At 560, the payment form may be transmitted to the prospective purchaser using the form created at step 550. This is also completed using the alternative keyboard, and not a separate application or some other external process. A delivery form, which may accept information input by a prospective purchaser regarding delivery options, costs, addresses, and the like, may be transmitted using the alternative keyboard at 570 as well, with no external application being used.

After the prospective seller inputs their payment information and any delivery information, the payment is processed and delivery information is provided at 580 to the seller so that delivery of the product can begin. This information may be integrated with shipping platforms, drop shipping services, or other online storefronts, such as those like Shopify® to enable the delivery to complete.

The process then ends at 595.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A non-volatile machine-readable storage medium storing a program having instructions which when executed by a processor in a mobile device of a prospective seller will cause the processor to:
    enable an alternative keyboard within an operating system of the mobile device of the prospective seller, the alternative keyboard including:
        access to a database of available products for sale by the prospective seller using the alternative keyboard through interaction with the alternative keyboard, and
        access to a payment processing system suitable to process and accept payment for a product through interaction with the keyboard; and
    receive input on the alternative keyboard from the prospective seller in response to an inquiry from a prospective purchaser using a remote computing device, the inquiry received in a chat window on the mobile device of the prospective seller using the alternative keyboard to:
        select one of the products in response to the inquiry;
        select product data for the selected one of the products from the database of available products using the chat window to the prospective purchaser, the mobile device of the prospective seller thereafter transmit the product data to the remote computing device of the prospective purchaser, and
        initiate a transaction with the prospective purchaser within the chat window of the mobile device of the prospective seller using the payment processing system by generating a purchase form within the chat window including the selected one of the products, an associated price for the selected one of the products, and a form for accepting payment and delivery information within the chat window from the prospective purchaser;
        transmit the purchase form to the remote computing device of the prospective purchaser within the chat window, wherein the prospective purchaser of the selected one of the products from the database of available products may complete payment and input delivery information without leaving the chat window using the payment processing system within the chat window.

2. The apparatus of claim 1 wherein the instructions further cause the processor to begin the process of delivery by transmitting the delivery information and confirmation of payment to an order fulfillment system.

3. The apparatus of claim 1 wherein the payment system includes a hyperlink that is accessed using a web preview function of the software operating the chat window.

4. The apparatus of claim 1 wherein payment is confirmed to the prospective seller by a notification within the chat window.

5. The apparatus of claim 1 wherein the instructions further cause the processor to store a history of all chat conversations and completed purchases in association with a particular purchaser, the history suitable for use in subsequent communications about a product or completed purchase.

6. The apparatus of claim 1 wherein the instructions further cause the processor to access multiple chat services through the same application, using the same chat window and alternative keyboard.

7. The apparatus of claim 1 further comprising:
    a user input device;
    a display device;
    a processor; and
    a memory;
    wherein the processor and the memory comprise circuits and software for performing the instructions on the storage medium.

8. A system for completing a sale using a mobile device, the system comprising:
    an alternative keyboard within an operating system of the mobile device of a prospective seller, the alternative keyboard including:
        access to a database of available products for sale by the prospective seller using the alternative keyboard through interaction with the alternative keyboard, and
        access to a payment processing system suitable to process and accept payment for a product through interaction with the keyboard; and
    a user interface for receiving input on the alternative keyboard from the prospective seller in response to an inquiry from a prospective purchaser using a remote computing device, the inquiry received in a chat window on the mobile device of the prospective seller using the alternative keyboard to:
        select one of the products in response to the inquiry;
        select product data for the selected one of the products from the database of available products using the chat window to the prospective purchaser, the mobile device of the prospective seller thereafter transmit the product data to the remote computing device of the prospective purchaser, and
        initiate a transaction with the prospective purchaser within the chat window of the mobile device of the prospective seller using the payment system within the chat by generating a purchase form within the chat window including the selected one of the products, an associated price for the selected one of the products, and a form for accepting payment and delivery information within the chat window from the prospective purchaser;

transmit the purchase form to the remote computing device of the prospective purchaser within the chat window, wherein the prospective purchaser of the selected one of the products from the database of available products may complete payment and input delivery information without leaving the chat window using the payment processing system provided to the prospective purchaser by the prospective seller using the alternative keyboard in the chat window.

9. The system of claim 8 wherein the alternative keyboard is further used to begin the process of delivery by transmitting the delivery information and confirmation of payment to an order fulfillment system.

10. The system of claim 8 wherein the payment system includes a hyperlink that is accessed using a web preview function of the software operating the chat window.

11. The system of claim 8 wherein payment is confirmed to the prospective seller by a notification within the chat window.

12. The system of claim 8 further comprising a memory to store a history of all chat conversations and completed purchases in association with a particular purchaser, the history suitable for use in subsequent communications about a product or completed purchase.

13. The system of claim 8 wherein multiple chat services may be accessed through the same application, using the same chat window and alternative keyboard.

14. A method of completing a sale, the method comprising enabling an alternative keyboard within an operating system of a mobile device of a prospective seller, the alternative keyboard including:
  access to a database of available products for sale by the prospective seller using the alternative keyboard through interaction with the alternative keyboard, and
  access to a payment processing system suitable to process and accept payment for a product through interaction with the keyboard; and
receiving input on the alternative keyboard from the prospective seller in response to an inquiry from a prospective purchaser using a remote computing device, the inquiry received in a chat window on the mobile device of the prospective seller using the alternative keyboard to:
  select one of the products in response to the inquiry;
  select product data for the selected one of the products from the database of available products using the chat window to the prospective purchaser, the mobile device of the prospective seller thereafter transmit the product data to the remote computing device of the prospective purchaser, and
  initiate a transaction with the prospective purchaser within the chat window of the mobile device of the prospective seller using the payment system by generating a purchase form within the chat window including the selected one of the products, and associated price for the selected one of the products, and a form for accepting payment and delivery information within the chat window from the prospective purchaser;
  transmit the purchase form to the remote computing device of the prospective purchaser within the chat window, wherein the prospective purchaser of the selected one of the products from the database of available products may complete payment and input delivery information without leaving the chat window using the payment processing system within the chat window.

15. The method of claim 14 wherein is further used to begin the process of delivery by transmitting the delivery information and confirmation of payment to an order fulfillment system.

16. The method of claim 14 wherein the payment system includes a hyperlink that is accessed using a web preview function of the software operating the chat window.

17. The method of claim 14 wherein payment is confirmed to the prospective seller by a notification within the chat window.

18. The method of claim 14 wherein a history of all chat conversations and completed purchases are stored in association with a particular purchaser, the history suitable for use in subsequent communications about a product or completed purchase.

19. The method of claim 14 wherein the multiple chat services are accessed through the same application, using the same chat window and alternative keyboard.

* * * * *